3,240,706
STABILIZATION OF ORGANIC SUBSTANCES
Henryk A. Cyba, Evanston, and Robert H. Rosenwald, Western Springs, Ill., assignors to Universal Oil Products Company, Des Plaines, Ill., a corporation of Delaware
No Drawing. Original application Jan. 24, 1963, Ser. No. 253,767. Divided and this application July 3, 1963, Ser. No. 292,760
10 Claims. (Cl. 252—51.5)

This is a division of application Serial No. 253,767, field January 24, 1963, now abandoned, and relates to the stabilization of organic substances by employing a novel composition of matter as inhibitor.

The novel composition of matter is a hydroxyphenyl aminophenyl ether of the following formula:

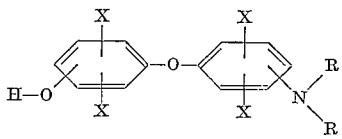

where R is selected from the group consisting of hydrogen, alkyl, cycloalkyl, aryl, aralkyl, algaryl, hydroxyalkyl, hydroxyaryl, hydroxyaralkyl and hydroxyalkaryl radicals, and X is selected from the group consisting of hydrogen and/or halogen and particularly chlorine.

In one preferred embodiment, R in the above formula is hydrogen and/or an alkyl group of from 1 to 20 and preferably from 1 to 12 carbon atoms each. In another preferred emboidment, R is hydrogen and/or cyclohexyl or benzyl. In still another preferred embodiment, X is hydrogen and/or halogen and particularly chlorine.

Where X and R in the above formula are hydrogen, a preferred compound is 4-hydroxyphenyl-4'-aminophenyl ether. Where R is an alkyl group, illustrative compounds include 4-hydroxyphenyl 4'-methylaminophenyl ether,
4-hydroxyphenyl 4'-ethylaminophenyl ether,
4-hydroxyphenyl 4'-proylaminophenyl ether,
4-hydroxyphenyl 4'-butylaminophenyl ether,
4-hydroxyphenyl 4'-pentylaminophenyl ether,
4-hydroxyphenyl 4'-hexylaminophenyl ether,
4-hydroxyphenyl 4'-heptylaminophenyl ether,
4-hydroxyphenyl 4'-octylaminophenyl ether,
4-hydroxyphenyl 4'-nonylaminophenyl ether,
4-hydroxyphenyl 4'-decylaminophenyl ether,
4-hydroxyphenyl 4'-undecylaminophenyl ether,
4-hydroxyphenyl 4'-dodecylaminophenyl ether,
4-hydroxyphenyl 4'-tridecylaminophenyl ether,
4-hydroxyphenyl 4'-tetradecylaminophenyl ether,
4-hydroxyphenyl 4'-pentadecylaminophenyl ether,
4-hydroxyphenyl 4'-hexadecylaminophenyl ether,
4-hydroxyphenyl 4'-heptadecylaminophenyl ether,
4-hydroxyphenyl 4'-octadecylaminophenyl ether,
4-hydroxyphenyl 4'-nonadecylaminophenyl ether,
4-hydroxyphenyl 4'-eicosylaminophenyl ether, etc. In general, it is preferred that the elkyl group is of secondary configuration and illustrative preferred compounds comprise 4-hydroxyphenyl 4'-isopropylaminophenyl ether,
4-hydroxyphenyl 4'-sec-butylaminophenyl ether,
4-hydroxyphenyl 4'-sec-pentylaminophenyl ether,
4-hydroxyphenyl 4'-sec-hexylaminophenyl ether,
4-hydroxyphenyl 4'-sec-heptylaminophenyl ether,
4-hydroxyphenyl 4'-sec-octylaminophenyl ether, etc.

Additional illustrative compounds include 4-hydroxyphenyl 2'-aminophenyl ether,
4-hydroxyphenyl 2'-methylaminophenyl ether,
4-hydroxyphenyl 2'-ethylaminophenyl ether,
4-hydroxyphenyl 2'-propylaminophenyl ether,
4-hydroxyphenyl 2'-butylaminophenyl ether,
4-hydroxyphenyl 2'-pentylaminophenyl ether,
4-hydroxyphenyl 2'-hexylaminophenyl ether,
4-hydroxyphenyl 2'-heptylaminophenyl ether,
4-hydroxyphenyl 2'-octylaminophenyl ether,
4-hydroxyphenyl 2'-nonylaminophenyl ether,
4-hydroxyphenyl 2'-decylaminophenyl ether,
4-hydroxyphenyl 2'-undecylaminophenyl ether,
4-hydroxyphenyl 2'-dodecylaminophenyl ether,
4-hydroxyphenyl 2'-tridecylaminophenyl ether,
4-hydroxyphenyl 2'-tetradecylaminophenyl ether,
4-hydroxyphenyl 2'-pentadecylaminophenyl ether,
4-hydroxyphenyl 2'-hexadecylaminophenyl ether,
4-hydroxyphenyl 2'-heptadecylaminophenyl ether,
4-hydroxyphenyl 2'-octadecylaminophenyl ether,
4-hydroxyphenyl 2'-nonadecylaminophenyl ether,
4-hydroxyphenyl 3'-eicosylaminophenyl ether, etc.,
2-hydroxyphenyl 4'-aminophenyl ether,
2-hydroxyphenyl 4'-methylaminophenyl ether,
2-hydroxyphenyl 4'-ethylaminophenyl ether,
2-hydroxyphenyl 4'-propylaminophenyl ether,
2-hydroxyphenyl 4'-butylaminophenyl ether,
2-hydroxyphenyl 4'-pentylaminophenyl ether,
2-hydroxyphenyl 4'-hexylaminophenyl ether,
2-hydroxyphenyl 4'-heptylaminophenyl ether,
2-hydroxyphenyl 4'-octylaminophenyl ether,
2-hydroxyphenyl 4'-nonylaminophenyl ether,
2-hydroxyphenyl 4'-decylaminophenyl ether,
2-hydroxyprenyl 4'-undecylaminophenyl ether,
2-hydroxyphenyl 4'-dodecylaminophenyl ether,
2-hydroxyphenyl 4'-tridecylaminophenyl ether,
2-hydroxyphenyl 4'-tetradecylaminophenyl ether,
2-hydroxyphenyl 4'-pentadecylaminophenyl ether,
2-hydroxyphenyl 4'-hexadecylaminophenyl ether,
2-hydroxyphenyl 4'-heptadecylaminophenyl ether,
2-hydroxyphenyl 4'-octadecylaminophenyl ether,
2-hydroxyphenyl 4'-nonadecylaminophenyl ether,
2-hydroxyphenyl 4'-eicosylaminophenyl ether, etc.

Here again, it is preferred that the alkyl group of three or more carbon atoms is of secondary configuration and will be selected from those hereinbefore specifically set forth.

Where X is hydrogen and both R radicals in the above formula are alkyl, illustrative compounds include 4-hydroxyphenyl 4'-dimethylaminophenyl ether, 4-hydroxyphenyl 4'-diethylaminophenyl ether, 4-hydroxyphenol 4'-dipropylaminophenyl ether, 4-hydroxyphenyl 4'-dibutylaminophenyl ether, 4-hydroxyphenyl 4'-dipentylaminophenyl ether, 4 - hydroxyphenyl 4' - dihexylaminophenyl ether, 4-hydroxyphenyl 4'-diheptylaminophenyl ether, 4-hydroxyphenyl 4'-dioctylaminophenyl ether, 4-hydroxyphenyl 4'-dinonylaminophenyl ether, 4-hydroxyphenyl 4'-didecylaminophenyl ether, 4-hydroxyphenyl 4'-diundecylaminophenyl ether, 4-hydroxyphenyl 4'-didodecylaminophenyl ether, etc., and corresponding compounds in which the alkyl groups are different from each other as, for example, in compounds as 4-hydroxyphenyl 4'-N-methyl-N-ethylphenyl ether, 4-hydroxyphenyl 4' - N-methyl-N-propylphenyl ether, 4-hydroxyphenyl 4'-N-methyl-N-butylphenyl ether, 4-hydroxyphenyl 4'-N-methyl-N-pentylphenyl ether, 4-hydroxyphenyl 4'-N-methyl-N-hexylphenyl ether, 4-hydroxyphenyl 4' - N-methyl-N-heptylphenyl ether, 4-hydroxyphenyl 4'-N-methyl-N-octylphenyl ether, 4-hydroxyphenyl 4'-N-methyl-N-nonylphenyl ether, 4-hydroxyphenyl 4'-N-methyl-N-decylphenyl ether, 4-hydroxyphenyl 4′-N-methyl-N-undecylphenyl ether, 4-hydroxyphenyl 4′-N-methyl-N-dodecylphenyl ether, etc., 4-hydroxyphenyl 4′-N-ethyl-N-propylphenyl ether, 4-hydroxyphenyl 4′-N-ethyl-N-butylphenyl ether, 4-hydroxyphenyl 4′-N-ethyl-N-pentylphenyl ether, 4-hydroxyphenyl 4′-N-ethyl-N-hexylphenyl ether, 4-hydroxyphenyl 4′-N-ethyl-N-heptylphenyl ether, 4-hydroxyphenyl 4′-N-ethyl-N-octylphenyl ether, 4-hydroxyphenyl 4′-N-ethyl-N-nonylphenyl ether, 4-hydroxyphenyl 4′-N-ethyl-N-decylphenyl ether, 4-hydroxyphenyl 4′-N-ethyl-N-undecylphenyl ether, 4-hydroxyphenyl 4′-N-ethyl-N-dodecylphenyl ether, etc., 4-hydroxyphenyl 4′-N-propyl-N-butylphenyl ether, 4-hydroxyphenyl 4′-N-propyl-N-pentylphenyl ether, 4-hydroxyphenyl 4′-N-propyl-N-hexylphenyl ether, 4-hydroxyphenyl 4′-N-propyl-N-heptylphenyl ether, 4-hydroxyphenyl 4′-N-propyl-N-octylphenyl ether, 4-hydroxyphenyl 4′-N-propyl-N-nonylphenyl ether, 4-hydroxyphenyl 4′-N-propyl-N-decylphenyl ether, 4-hydroxyphenyl 4′-N-propyl-N-undecylphenyl ether, 4-hydroxyphenyl 4′-N-propyl-N-dodecylphenyl ether, etc., 4-hydroxyphenyl 4′-N-butyl-N-pentylphenyl ether, 4-hydroxyphenyl 4′-N-butyl-N-hexylphenyl ether, 4-hydroxyphenyl 4′-N-butyl-N-heptylphenyl ether, 4-hydroxyphenyl 4′-N-butyl-N-octylphenyl ether, 4-hydroxyphenyl 4′-N-butyl-N-nonylphenyl ether, 4-hydroxyphenyl 4′-N-butyl-N-decylphenyl ether, 4-hydroxyphenyl 4′-N-butyl-N-undecylphenyl ether, 4-hydroxyphenyl 4′-N-butyl-N-dodecylphenyl ether, etc., 4-hydroxyphenyl 4′-N-pentyl-N-hexylphenyl ether, 4-hydroxyphenyl 4′-N-pentyl-N-heptylphenyl ether, 4-hydroxyphenyl 4′-N-pentyl-N-octylphenyl ether, 4-hydroxyphenyl 4′-N-pentyl-N-nonylphenyl ether, 4-hydroxyphenyl 4′-N-pentyl-N-decylphenyl ether, 4-hydroxyphenyl 4′-N-pentyl-N-undecylphenyl ether, 4-hydroxyphenyl 4′-N-pentyl-N-dodecylphenyl ether, etc., 4-hydroxyphenyl 4′-N-hexyl-N-heptylphenyl ether, 4-hydroxyphenyl 4′-N-hexyl-N-octylphenyl ether, 4-hydroxyphenyl 4′-N-hexyl-N-nonylphenyl ether, 4-hydroxyphenyl 4′-N-hexyl-N-decylphenyl ether, 4-hydroxyphenyl 4′-N-hexyl-N-undecylphenyl ether, 4-hydroxyphenyl 4′-N-hexyl-N-dodecylphenyl ether, etc., 4-hydroxyphenyl 4′-N-heptyl-N-octylphenyl ether, 4-hydroxyphenyl 4′-N-heptyl-N-nonylphenyl ether, 4-hydroxyphenyl 4′-N-heptyl-N-decylphenyl ether, 4-hydroxyphenyl 4′-N-heptyl-N-undecylphenyl ether, 4-hydroxyphenyl 4′-N-heptyl-N-dodecylphenyl ether, etc., 4-hydroxyphenyl 4′-N-octyl-N-nonylphenyl ether, 4-hydroxyphenyl 4′-N-octyl-N-decylphenyl ether, 4-hydroxyphenyl 4′-N-octyl-N-undecylphenyl ether, 4-hydroxyphenyl 4′-N-octyl-N-dodecylphenyl ether, etc. Also, illustrated compounds in this embodiment of the invention comprise the corresponding 4-hydroxyphenyl 2′-dialkylaminophenyl ethers and 2-hydroxyphenyl 4′-dialkylaminophenyl ethers in which the alkyl groups are selected from those specifically set forth above.

Illustrative compounds in which one or both of the R groups are cycloalkyl include 4-hydroxyphenyl 4′-cyclopentylaminophenyl ether, 4-hydroxyphenyl 4′-cyclohexylaminophenyl ether, 4-hydroxyphenyl 4′-cycloheptylaminophenyl ether, 4-hydroxyphenyl 4′-cyclooctylaminophenyl ether, etc., 2-hydroxyphenyl 4′-cyclopentylaminophenyl ether, 2-hydroxyphenyl 4′-cyclohexylaminophenyl ether, etc., 4-hydroxyphenyl 4′-dicyclopropylaminophenyl ether, 4-hydroxyphenyl 4′-dicyclobutylaminophenyl ether, 4-hydroxyphenyl 4′-dicyclopentylaminophenyl ether, 4-hydroxyphenyl 4′-dicyclohexylaminophenyl ether, 4-hydroxyphenyl 4′-dicycloheptylaminophenyl ether, 4-hydroxyphenyl 4′-dicyclooctylaminophenyl ether, etc., 4-hydroxyphenyl 4′-N-cyclopropyl-N-cyclobutylaminophenyl ether, 4-hydroxyphenyl 4′-N-cyclopropyl-N-cyclopentylaminophenyl ether, 4-hydroxyphenyl 4′-N-cyclopropyl-N-cyclohexylaminophenyl ether, 4-hydroxyphenyl 4′-N-cyclopropyl-N-cycloheptylaminophenyl ether, 4-hydroxyphenyl 4′-N-cyclopropyl-N-cyclooctylaminophenyl ether, etc., 4-hydroxyphenyl 4′-N-cyclobutyl-N-cyclopentylaminophenyl ether, 4-hydroxyphenyl 4′-N-cyclobutyl-N-cyclohexylaminophenyl ether, 4-hydroxyphenyl 4′-N-cyclobutyl-N-cycloheptylaminophenyl ether, 4-hydroxyphenyl 4′-N-cyclobutyl-N-cyclooctylaminophenyl ether, etc., 4-hydroxyphenyl 4′-N-cyclopentyl-N-cyclohexylaminophenyl ether, 4-hydroxyphenyl 4′-N-cyclopentyl-N-cycloheptylaminophenyl ether, 4-hydroxyphenyl 4′-N-cyclopentyl-N-cyclooctylaminophenyl ether, etc., 4-hydroxyphenyl 4′-N-cyclohexyl-N-cycloheptylaminophenyl ether, 4-hydroxyphenyl 4′-N-cyclohexyl-N-cyclooctylaminophenyl ether, etc., as well as the corresponding 2,4′ and 4,2′ compounds. In general, the cyclohexyl derivatives are preferred.

Illustrative compounds in which one or both R groups are aryl include 4-hydroxyphenyl 4′-phenylaminophenyl ether, 4-hydroxyphenyl 4′-naphthylaminophenyl ether, 4-hydroxyphenyl 4′-anthracylaminophenyl ether, etc., 4-hydroxyphenyl 4′-N,N-diphenylaminophenyl ether, 4-hydroxyphenyl 4′-N-phenyl-N-naphthylaminophenyl ether, etc., as well as the corresponding 4,2′ and 2,4′ compounds. In general, the phenyl substitutions are preferred.

Where one or both of the R groups in the above formula are aralkyl, illustrative compounds include 4-hydroxyphenyl 4′-benzylaminophenyl ether,
4-hydroxyphenyl 4′-phenylethylaminophenyl ether,
4-hydroxyphenyl 4′-phenylpropylaminophenyl ether,
4-hydroxyphenyl 4′-phenylbutylaminophenyl ether, etc.,
4-hydroxyphenyl 4′-dibenzylaminophenyl ether,
4-hydroxyphenyl 4′-N-benzyl-N-phenylethylaminophenyl ether,
4-hydroxyphenyl 4′-N-benzyl-N-phenylpropylaminophenyl ether,
4-hydroxyphenyl 4′-N-benzyl-N-phenylbutylaminophenyl ether, etc.,
4-hydroxyphenyl 4′-N-phenylethyl-N-phenylpropylaminophenyl ether,
4-hydroxyphenyl 4′-N-phenylethyl-N-phenylbutylaminophenyl ether, etc., as well as the corresponding 4,2′ and 2,4′ compounds.

Where one or both of the R groups in the above formula are alkaryl, illustrative compounds include 4-hydroxyphenyl 4′-tolylaminophenyl ether,
4-hydroxyphenyl 4′-xylylaminophenyl ether,
4-hydroxyphenyl 4′-ethylphenylaminophenyl ether,
4-hydroxyphenyl 4′-diethylphenylaminophenyl ether,
4-hydroxyphenyl 4′-propylphenylaminophenyl ether,
4-hydroxyphenyl 4′-dipropylphenylaminophenyl ether,
4-hydroxyphenyl 4′-butylphenylaminophenyl ether,
4-hydroxyphenyl 4′-dibutylphenylaminophenyl ether,
4-hydroxyphenyl 4′-methylethylphenylaminophenyl ether,
4-hydroxyphenyl 4′-methylpropylphenylaminophenyl ether,
4-hydroxyphenyl 4′-methylbutylphenylaminophenyl ether,
4-hydroxyphenyl 4′-dimethylethylphenylaminophenyl ether,
4-hydroxyphenyl 4′-dimethylpropylphenylaminophenyl ether,
4-hydroxyphenyl 4′-dimethylbutylphenylaminophenyl ether,
4-hydroxyphenyl 4′-methyldibutylphenylaminophenyl ether, etc., corresponding compounds in which both R groups are selected from the alkaryl radicals specifically set forth above, as well as the corresponding 4,2′ and 2,4′ compounds.

Illustrative compounds in which one or both of the R groups are hydroxyalkyl radicals include 4-hydroxyphenyl 4′-N-hydroxymethylaminophenyl ether,
4-hydroxyphenyl 4′-N-hydroxyethylaminophenyl ether,
4-hydroxyphenyl 4′-N-hydroxypropylaminophenyl ether,
4-hydroxyphenyl 4′-N-hydroxybutylaminophenyl ether,
4-hydroxyphenyl 4′-N-hydroxypentylaminophenyl ether, 4-hydroxyphenyl 4'-N-hydroxyhexylaminophenyl ether, etc.,
4-hydroxyphenyl 4'-di-(hydroxymethyl)-aminophenyl ether,
4-hydroxyphenyl 4'-di-(hydroxyethyl)-aminophenyl ether,
4-hydroxyphenyl 4'-di-(hydroxypropyl)-aminophenyl ether,
4-hydroxyphenyl 4'-di-(hydroxybutyl)-aminophenyl ether,
4-hydroxyphenyl 4'-di-(hydroxypentyl)-aminophenyl ether,
4-hydroxyphenyl 4'-di-(hydroxyhexyl)-aminophenyl ether, etc.,
4-hydroxyphenyl 4'-N-hydroxymethyl-N-hydroxyethyl-aminophenyl ether,
4-hydroxyphenyl 4'-N-hydroxymethyl-N-hydroxypropyl-aminophenyl ether,
4-hydroxyphenyl 4'-N-hydroxymethyl-N-hydroxybutyl-aminophenyl ether, etc.,
4-hydroxyphenyl 4'-N-hydroxyethyl-N-hydroxypropyl-aminophenyl ether,
4-hydroxyphenyl 4'-N-hydroxyethyl-N-hydroxybutyl-aminophenyl ether, etc.,
4-hydroxyphenyl 4'-N-hydroxypropyl-N-hydroxybutyl-aminophenyl ether, etc., as well as the corresponding 4,2' and 2,4' compounds.

Illustrative compounds in which one or both of the R groups in the above formula are hydroxyaryl include 4-hydroxyphenyl 4'-hydroxyphenylaminophenyl ether,
4-hydroxyphenyl 4'-dihydroxyphenylaminophenyl ether,
4-hydroxyphenyl 4'-trihydroxyphenylaminophenyl ether, etc.,
4-hydroxyphenyl 4'-hydroxynaphthylaminophenyl ether,
4-hydroxyphenyl 4'-dihydroxynaphthylaminophenyl ether,
4-hydroxyphenyl 4'-trihydroxynaphthylaminophenyl ether, etc.,
4-hydroxyphenyl 4'-di-(hydroxyphenyl)-aminophenyl ether,
4-hydroxyphenyl 4'-di-(dihydroxyphenyl)-aminophenyl ether,
4-hydroxyphenyl 4'-di-(trihydroxyphenyl)-aminophenyl ether, etc.,
4-hydroxyphenyl 4'-N-hydroxyphenyl-N-dihydroxy-phenylaminophenyl ether,
4-hydroxyphenyl 4'-N-trihydroxyphenylaminophenyl ether,
4-hydroxyphenyl 4'-N-dihydroxyphenyl-N-trihydroxy-phenylaminophenyl ether, etc., as well as the corresponding 4,2' and 2,4' compounds.

Where one or both of the R groups are hydroxy aralkyl, illustrative compounds include 4-hydroxphenyl 4'-hydroxybenzylaminophenyl ether,
4-hydroxyphenyl 4'-dihydroxybenzylaminophenyl ether,
4-hydroxyphenyl 4'-trihydroxybenzylaminophenyl ether,
4-hydroxyphenyl 4'-hydroxyphenylethylaminophenyl ether,
4-hydroxyphenyl 4'-dihydroxyphenylethylaminophenyl ether,
4-hydroxyphenyl 4'-trihydroxyphenylethylaminophenyl ether,
4-hydroxyphenyl 4'-hydroxyphenylpropylaminophenyl ether,
4-hydroxyphenyl 4'-dihydroxyphenylpropylaminophenyl ether,
4-hydroxyphenyl 4'-trihydroxyphenylpropylaminophenyl ether,
4-hydroxyphenyl 4'-hydroxyphenylbutylaminophenyl ether,
4-hydroxyphenyl 4'-dihydroxyphenylbutylaminophenyl ether,
4-hydroxyphenyl 4'-trihydroxyphenylbutylaminophenyl ether, etc., corresponding naphthyl and anthracyl derivatives, as well as the corresponding 4,2' and 2,4' compounds.

Where on or both of the R groups in the above formula are hydroxyalkaryl, illustrative compounds include 4-hydroxyphenyl 4'-hydroxymethylphenylaminophenyl ether,
4-hydroxyphenyl 4'-hydroxyethylphenylaminophenyl ether,
4-hydroxyphenyl 4'-hydroxypropylphenylaminophenyl ether,
4-hydroxyphenyl 4'-hydroxybutylphenylaminophenyl ether,
4-hydroxyphenyl 4'-hydroxypentylphenylaminophenyl ether,
4-hydroxyphenyl 4'-hydroxyhexylphenylaminophenyl ether, etc.,
4-hydroxyphenyl 4'-di-(hydroxymethyl)-phenylamino-phenyl ether,
4-hydroxyphenyl 4'-di-(dihydroxymethyl)-phenylamino-phenyl ether,
4-hydroxyphenyl 4'-di-(trihydroxymethyl)-phenylamino-phenyl ether, etc.,
4-hydroxyphenyl 4'-di-(hydroxyethyl)-phenylamino-phenyl ether,
4-hydroxyphenyl 4'-di-(dihydroxyethyl)-phenylamino-phenyl ether,
4-hydroxyphenyl 4'-di-(trihydroxyethyl)-phenylamino-phenyl ether, etc.,
4-hydroxyphenyl 4'-di-(hydroxypropyl)-phenylamino-phenyl ether,
4-hydroxyphenyl 4'-di-(dihydroxypropyl)-phenylamino-phenyl ether,
4-hydroxyphenyl 4'-di-(trihydroxypropyl)-phenylamino-phenyl ether, etc.,
4-hydroxyphenyl 4'-di-(hydroxybutyl)-phenylamino-phenyl ether,
4-hydroxyphenyl 4'-di-(dihydroxybutyl)-phenylamino-phenyl ether,
4-hydroxyphenyl 4'-di-(trihydroxybutyl)-phenylamino-phenyl ether, etc.,
4-hydroxyphenyl 4'-N-hydroxymethylphenyl-N-di-hydroxymethylphenylaminophenyl ether,
4-hydroxyphenyl 4'-N-hydroxymethylphenyl-N-tri-hydroxymethylphenylaminophenyl ether,
4-hydroxyphenyl 4'-N-hydroxymethylphenyl-N-hydroxy-ethylphenylaminophenyl ether,
4-hydroxyphenyl 4'-N-hydroxymethylphenyl-N-hydroxy-propylphenylaminophenyl ether,
4-hydroxyphenyl 4'-N-hydroxymethylphenyl-N-hydroxy-butylphenylaminophenyl ether, etc.,
4-hydroxyphenyl 4'-N-hydroxyethylphenyl-N-hydroxy-propylphenylaminophenyl ether,
N-hydroxyphenyl 4'-N-hydroxyethylphenyl-N-hydroxy-butylphenylaminophenyl ether,
N-hydroxyphenyl 4'-N-hydroxypropylphenyl-N-hydroxy-butylphenylaminophenyl ether, etc., as well as the corresponding 4,2' and 2,4' compounds.

Where one or more of the X radicals are alkyl, illustrative compounds include 3-methyl-4-hydroxyphenyl 4'-aminophenyl ether,
3-ethyl-4-hydroxyphenyl 4'-aminophenyl ether,
3-propyl-4-hydroxyphenyl 4'-aminophenyl ether,
3-butyl-4-hydroxyphenyl 4'-aminophenyl ether,
3-pentyl-4-hydroxyphenyl 4'-aminophenyl ether,
3-hexyl-4-hydroxyphenyl 4'-aminophenyl ether, etc.,
3,5-dimethyl-4-hydroxyphenyl 4'-aminophenyl ether,
3,5-diethyl-4-hydroxyphenyl 4'-aminophenyl ether,
3,5-dipropyl-4-hydroxyphenyl 4'-aminophenyl ether,
3,5-dibutyl-4-hydroxyphenyl 4'-aminophenyl ether, etc.,
2-methyl-5-ethyl-4-hydroxyphenyl 4'-aminophenyl ether,
2-methyl-5-propyl-4-hydroxyphenyl 4'-aminophenyl ether,
2-methyl-5-butyl-4-hydroxyphenyl 4'-aminophenyl ether, etc., 2-ethyl-5-propyl-4-hydroxyphenyl 4'-aminophenyl ether,
2-ethyl-5-butyl-4-hydroxyphenyl 4'-aminophenyl ether, etc.,
2-propyl-5-butyl-4-hydroxyphenyl 4'-aminophenyl ether, etc.,
3-methyl-4-hydroxyphenyl 2'-methyl-4'-aminophenyl ether,
3-ethyl-4-hydroxyphenyl 2'-methyl-4'-aminophenyl ether,
3-propyl-4-hydroxyphenyl 2'-methyl-4'-aminophenyl ether,
3-butyl-4-hydroxyphenyl 2'-methyl-4'-aminophenyl ether,
3-ethyl-4-hydroxyphenyl 2'-ethyl-4'-aminophenyl ether,
3-ethyl-4-hydroxyphenyl 2'-propyl-4'-aminophenyl ether,
3-ethyl-4-hydroxyphenyl 2'-butyl-4'-aminophenyl ether,
3-propyl-4-hydroxyphenyl 2'-butyl-4'-aminophenyl ether,
3,5-dimethyl-4-hydroxyphenyl 2'-methyl-4'-aminophenyl ether,
3,5-dimethyl-4-hydroxyphenyl 2'-ethyl-4'-aminophenyl ether,
3,5-dimethyl-4-hydroxyphenyl 2'-propyl-4'-aminophenyl ether,
3,5-dimethyl-4-hydroxyphenyl 2'-butyl-4'-aminophenyl ether,
3,5-dimethyl-4-hydroxyphenyl 2',6'-dimethyl-4'-aminophenyl ether,
3,5-dimethyl-4-hydroxyphenyl 2',6'-diethyl-4'-aminophenyl ether,
3,5-diethyl-4-hydroxyphenyl 2',6'-diethyl-4'-aminophenyl ether,
3,5-diethyl-4-hydroxyphenyl 2',6'-dipropyl-4'-aminophenyl ether, etc., as well as the corresponding compounds in which the hydroxy and amino groups are in the 2,4' and 4,2' positions and the alkyl group or groups are in different positions on one or both of the rings, and similarly substituted hydroxyphenyl alkylamino or dialkylaminophenyl ethers.

Where one or both of the X radicals are halogen, these may be selected from chlorine, bromine, iodine and fluorine, the chlorine being particularly preferred when the compound is to be employed for some other use such as an insecticide, pharmaceutical, etc., or an intermediate in the preparation of the same. Illustrative compounds in this embodiment include
2-chloro-4-hydroxyphenyl 4'-aminophenyl ether,
3-chloro-4-hydroxyphenyl 4'-aminophenyl ether,
2,6-dichloro-4-hydroxyphenyl 4'-aminophenyl ether,
3,5-dichloro-4-hydroxyphenyl 4'-aminophenyl ether,
2,3,5-trichloro-4-hydroxyphenyl 4'-aminophenyl ether,
3,5,6-trichloro-4-hydroxyphenyl 4'-aminophenyl ether,
2,3,5,6-tetrachloro-4-hydroxyphenyl 4'-aminophenyl ether,
3-chloro-4-hydroxyphenyl 2'-chloro-4'-aminophenyl ether,
3,5-dichloro-4-hydroxyphenyl 2'-chloro-4'-aminophenyl ether,
3,5-dichloro-4-hydroxyphenyl 2',6'-dichloro-4'-aminophenyl ether, etc., as well as corresponding compounds in which the hydroxy and amino groups are in the positions of 2,4' and 4,2', and similarly substituted compounds in which one or more of the halogens are bromine, iodine and/or fluorine, as well as a mixture of one or more of these other halogens with chlorine. Also comprised within this embodiment of the invention are similarly substituted hydroxyphenyl alkylaminophenyl or hydroxyphenyl dialkylaminophenyl ethers.

Where one or more of the X radicals are haloalkyl, illustrative compounds include
3-chloromethyl-4-hydroxyphenyl 4'-aminophenyl ether,
3-chloroethyl-4-hydroxyphenyl 4'-aminophenyl ether,
3-chloropropyl-4-hydroxyphenyl 4'-aminophenyl ether,
3-chlorobutyl-4-hydroxyphenyl 4'-aminophenyl ether,
3,5-di-(chloromethyl)-4-hydroxyphenyl 4'-aminophenyl ether,
3,5-di-(chloroethyl)-4-hydroxyphenyl 4'-aminophenyl ether,
3,5-di-(chloropropyl)-4-hydroxyphenyl 4'-aminophenyl ether,
3,5-di-(chlorobutyl)-4-hydroxyphenyl 4'-aminophenyl ether,
3,5-di-(chloromethyl)-4-hydroxyphenyl 2'-chloromethyl-4'-aminophenyl ether,
3,5-di-(chloromethyl)-4-hydroxyphenyl 2'-chloroethyl-4'-aminophenyl ether,
3,5-di-(chloromethyl)-4-hydroxyphenyl 2'-chloropropyl-4'-aminophenyl ether,
3,5-di-(chloromethyl)-4-hydroxyphenyl 2'-chlorobutyl-4'-aminophenyl ether,
3,5-di-(chloromethyl)-4-hydroxyphenyl 2',6'-di-(chloromethyl)-4'-aminophenyl ether,
3,5-di-(chloromethyl)-4-hydroxyphenyl 2',6'-di-(chloroethyl)-4'-aminophenyl ether,
3,5-di-(chloroethyl)-4-hydroxyphenyl 2',6'-di-(chloroethyl)-4'-aminophenyl ether,
3,5-di-(chloroethyl)-4-hydroxyphenyl 2',6'-di-(chloropropyl)-4'-aminophenyl ether,
3,5-di-(chloropropyl)-4-hydroxyphenyl 2',6'-di-(chlorobutyl)-4'-aminophenyl ether, etc., as well as corresponding compounds in which the hydroxy and amino radicals are in the positions 2,4' and 4,2' and the amino group may contain 1 or 2 hydrocarbon substituents.

It is understood that the specific compounds hereinbefore set forth are illustrative and not limiting. For example, the hydroxy and/or amino groups may be in the positions of 2,2'-, 2,3'-, 3,2'-, 3,3'-, 3,4'- or 4,3'-. In some preparations a mixture of isomers is produced, and the use of such mixture is comprised within the scope of the present invention. Also, it is understood that the different compounds are not necessarily equivalent and that the specific compound will be selected with reference to the particular use of the compound as will be hereinafter described.

The novel compounds of the present invention are prepared in any suitable manner. In one method they are prepared by forming the potassium, sodium, etc. salt of hydroquinone and then reacting with p-nitrochlorobenzene, o-nitrochlorobenzene or the corresponding aminochlorobenzene, as desired, to form the hydroxyphenyl nitrophenyl or hydroxyphenol aminophenyl ether, with the liberation of potassium chloride, sodium chloride, etc. When notrochlorobenzene is used, the desired amine is produced either by hydrogenation of the nitro group to the amine group or by reductive alkylation to form the N-alkylated derivative. In general, the yields obtained when starting with hydroquinone are low due to the simultaneous occurrence of additional reactions. In another method, these compounds may be prepared by starting with monobenzylhydroquinone, which is available commercially, and reacting with potassium hydroxide, sodium hydroxide, etc., to form the corresponding salt and then reacting with nitrochlorobenzene or aminochlorobenzene. Here again, when nitrochlorobenzene is employed, the product may be converted to the corresponding amine or N-alkylated derivative by hydrogenation or by reductive alkylation. The reductive alkylation preferably is effected using the desired ketone, a hydrogen pressure of from about 100 to 5000 pounds per square inch or more, a temperature of from about 50° to about 275° C. and a reductive alkylation catalyst. Reductive alkylation catalysts comprise those containing platinum, palladium, nickel, chromium, etc., which may be in the form of the free metal, oxide and/or sulfide, etc. During the reductive alkylation or in a separate hydrogenation treatment, the benzyl group is removed to form the desired hydroxyphenyl aminophenyl ether. The benzyloxyphenyl aminophenyl ethers formed as intermediates also are believed to be new compositions of matter and are, likewise, being so claimed herein.

In one embodiment the novel compounds of the present invention are particularly useful as additives to prevent deterioration of organic substances in storage, transportation and/or use due to oxygen and/or ozone, as well as to improve the thermal stability of the organic substance. In this embodiment of the invention, X in the above formula preferably is hydrogen or a hydrocarbon substituent. In a specific embodiment the novel compounds of the present invention are particularly applicable to the stabilization of lubricants including lubricating oils and greases. In lubricating oils, the additive serves a number of important functions such as oxidation inhibitor (peroxide decomposer), bearing corrosion inhibitor, ring anti-plugging additive, anti-friction additive, lubricity additive, detergent, etc.

The lubricating oil may be mineral lubricating oil derived from paraffinic, naphthenic, asphaltic or mixed base petroleum crudes or blends thereof and is generally highly refined. In another embodiment the lubricating oil is a synthetic lubricating oil and may be one or a mixture of various types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethyhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentanediol-di-(2-ethylhexanonate), etc. The polyalkylene oxides and derivatives include polyisopropylene oxide, polyisopropylene oxide diether, polyisopropylene oxide diester, etc. The silicones include methyl silicones, methylphenyl silicones, etc., and the silicates include, for example, tetraisooctyl silicate, diphenyl di-n-dodecyl silane, octadecyl tri-n-decyl silane, polysilylmethylenes, silophenylene, various silane mixtures, silicone-ester blends, etc. The highly fluorinated hydrocarbons include fluorinated oil, perfluorohydrocarbons, etc.

Additional synthetic lubricating oils include (1) neopentyl glycol esters in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkanes such as trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., as well as the esters thereof and particularly triesters in which the ester portions each contain from three to twelve carbon atoms and may be selected from those hereinbefore specifically set forth in connection with the discussion of the neopentyl glycol esters, and (3) tricresylphosphate, trioctylphosphate, trinonylphosphate, tridecylphosphate, as well as mixed aryl and alkyl phosphates, etc.

The lubricating oils of petroleum origin include those referred to as motor lubricating oil, railroad type lubricating oil, marine oil, transformer oil, turbine oil, transmission oil, differential oil, diesel lubricating oil, gear oil, cutting oil, rolling oil, cylinder oil, hydraulic oil, slushing oil, specialty products oil, etc.

The novel compounds of the present invention also are used in the stabilization of greases made by compositing metallic soaps with the synthetic lubricating oils described above and are referred to herein as synthetic greases. These metal base synthetic greases may be further classified as lithium base synthetic grease, sodium base synthetic grease, calcium base synthetic grease, barium base synthetic grease, strontium base synthetic grease, aluminum base synthetic grease, barium complex greases, calcium complex greases, sodium-calcium greases, lithium-12-hydroxy stearate greases, lithium-calcium greases, calcium-lead greases, etc. These greases are solid or semi-solid gels and, in general, are prepared by the addition to the synthetic lubricating oil of hydrocarbon-soluble metal soaps or salts of higher fatty acids as, for example, lithium stearate, calcium stearate, aluminum naphthenate, etc. The grease may contain thickening agents such as silica-carbon black, talc, organic modified Bentonite, etc., polyacrylates, amides, polyamides, aluminum imides, phthalocyanines, oxanilides, complex aromatic imides and amides, hydantoin derivatives, benzidine dyes, aryl ureas, methyl N-n-octadecyl terephthalamate, etc. Another type of grease is prepared from oxidized petroleum wax, to which the saponifiable base is combined with the proper amount of the desired saponifying agent, and the resultant mixture processed to produce a grease. Other types of greases in which the features of the present invention are usable include petroleum grease, whale grease, wool grease, etc., and those made from inedible fats, tallow, butcher's waste, etc.

Other organic substances which deteriorate in storage, during treatment and/or in use, include hydrocarbons, and particularly motor fuels such as unsaturated gasoline, blends of unsaturated and saturated gasolines, etc., as well as jet fuel, diesel oil, mineral oil, industrial oil, fuel oil, residual oil, drying oil, waxes, resins, rubber, etc. These substances are adversely affected by oxygen, with the resultant formation of one or more undesirable gum, sediment, discoloration, corrosion, and/or other deleterious reactions.

The novel compounds also are used in the stabilization of polymers. Reference to polymers in the present application includes polyolefins, rubber, etc. The polyolefins preferably are of high molecular weight, usually having a molecular weight above 1000 and extending into the hundreds of thousand range. Generally, these are synthetically prepared. A typical example is the widely used polyethylene plastics. Other polyolefins include polypropenes, polybutenes and polymers of higher molecular weight olefins, as well as mixed polymers of ethylene-propylene, ethylene-butylene, propylene-butylene, ethylene-propylene-butylene, etc. These may be of the high density, medium density or low density type. Polyethylene is utilized, for example, as thermoplastic molding or coating agent. Because of its high dielectric strength and its resistance to water, polyethylene is particularly advantageous for use as insulators or dielectrics in condensers and other similar electronic equipment. However, polyethylene is subject to attack by atmospheric oxygen, particularly at elevated temperatures, either in use or during manufacture, and this impairs the desirable properties thereof including, for example, a reduction in the desirable electric properties, gellation upon oxidation, etc.

The novel compounds of the present invention also are used in the stabilization of fatty materials, including the stabilization of edible fats and oils, which may be of animal, vegetable or mineral origin and which tend to become rancid, especially during long periods of storage prior to use. Typical representatives of edible fats and oils include linseed oil, menhaden oil, cod liver oil, castor oil, olive oil, rapeseed oil, coconut oil, palm oil, corn oil, sesame oil, peanut oil, butter, fat, lard, beef tallow, etc. It is understood that other oils and fats may be treated within the scope of the present invention, including oils and fats which previously have been subjected to various treatments, such as blowing with air, heat treatment, hydrogenation, etc.

When used as an additive to organic substrates, the novel compounds of the present invention may be utilized in a concentration of from about 0.001% to about 25% by weight of the organic substrate, although in some cases higher or lower concentrations may be employed. The exact concentration to be used will depend upon the particular substrate to be treated. In most cases concentrations from about 0.01% to about 5% by weight generally will be employed.

It is understood that the composition of the present invention may be used along with other additives incorporated in the organic substrate. For example, one or more of an additional additive including metal deactivator, dye, viscosity index improver, pour point depressant, antifoaming additive, lubricity and extreme pressure additive, anti-scuffing additive, detergent, corrosion inhibitor, etc., may be incorporated in the substrate. When desired, the composition of the present invention may be prepared as a mixture with one or more of these other additives and marketed and/or incorporated in the substrate in this manner.

The composition of the present invention may be incorporated in the organic substrate in any suitable manner and at any suitable stage of preparation. When incorporated in a liquid substrate, the composition of matter is added thereto and initimately mixed by conventional means. When added to a solid or semi-solid substrate, the composition of the present invention preferably is added during the manufacture thereof in order to obtain initimate mixing. For example, in the manufacture of grease, the composition of the present invention may be added to one or more of the components of the grease prior to compositing and processing thereof, or it may be added to the mix at any time, preferably before final processing in order to obtain intimate mixing and dissolving thereof in the grease. In other cases, a solid substrate may be dipped, soaked, or immersed in the additive, or the latter may be sprayed, brushed or otherwise applied to the solid substrate.

The following examples are introduced to illustrate further the novelty and utility of the present invention but not with the intention of unduly limiting the same.

EXAMPLE I

The compound of this example is 4-hydroxyphenyl 4'-aminophenyl ether and was prepared as follows. 200 g. of monobenzylhydroquinone were reacted with 65 g. of potassium hydroxide in 200 g. of methanol. 314 g. of p-nitrochlorobenzene then were added, after which the mixture was heated to an average temperature of about 180° C. for about 7 hours. The reaction mixture remained fluid throughout the reaction. Following the reaction, the product was steam distilled to remove unreacted starting material, particularly p-nitrochlorobenzene. The yield of crude product was 440 g. and was crystallized from Skellysolve C (heptane fraction) to give a yield of 249 g. The 4-benzyloxyphenyl 4'-nitrophenyl ether product had a melting point of 97°–101° C.

205 g. of 4-benzyloxyphenyl 4'-nitrophenyl ether, prepared in the above manner, were hydrogenated in a rocking autoclave pressured with hydrogen at 60° C. in the presence of 50 g. of nickel hydrogenation catalyst and 800 g. of methanol solvent. The product was crystallized from toluene to separate 4-hydroxyphenyl 4'-aminophenyl ether having a melting point of 132°–134° C., a basic nitrogen of 3.2 meq./g. and a basic mole combining weight of 308, which corresponds to the theoretical basic mole combining weight of 291.

20 g. of 4-benzyloxyphenyl 4'-aminoether, prepared in the above manner, were dissolved in 150 g. of absolute alcohol, purged with carbon dioxide and reduced with 60 pounds of hydrogen in a Paar bomb at 24° C. in the presence of 5 g. of a 5% palladium on carbon catalyst. 5.5 pounds of hydrogen were consumed. The product was dissolved in methanol, filtered to remove the catalyst and vacuum distilled to remove the methanol. An odor of toluene was evident. The product is 4-hydroxyphenyl 4'-aminophenyl ether and had a basic nitrogen of 4.93 meq./g. and a basic mole combining weight of 202, which corresponds to the theoretical basic mole combining weight of 201.

The above product was recrystallized from toluene and gave the following elementary analyses:

| Element | Found | Theoretical |
|---|---|---|
| Carbon | 71.9 | 71.63 |
| Hydrogen | 5.72 | 5.51 |
| Oxygen | 15.8 | 15.90 |
| Nitrogen | 6.77 | 6.96 |

EXAMPLE II

The compound of this example is 4-hydroxyphenyl 4'-sec-butylaminophenyl ether and was prepared as follows. 40 g. of 4-hydroxyphenyl 4'-aminophenyl ether, prepared as described in Example I, were reductively alkylated with 150 g. of methyl ethyl ketone at 160° C. in the presence of 40 g. of a platinum-alumina catalyst. 40 g. of crude needles were obtained and the crude product was crystallized from normal heptane to separate 4-hydroxyphenyl 4'-sec-butylaminophenyl ether having a melting point of 117°–118° C., a basic nitrogen of 3.87 meq./g. and a basic mole combining weight of 258, the latter corresponding to the theoretical basic mole combining weight of 257. The product gave the following elementary analyses:

| Element | Found | Theoretical |
|---|---|---|
| Carbon | 74.55 | 74.679 |
| Hydrogen | 7.43 | 7.442 |
| Oxygen | 13.07 | 12.435 |
| Nitrogen | 5.16 | 5.443 |

EXAMPLE III

The compound of this example is 4-hydroxyphenyl 4'-isopropylaminophenyl ether and was prepared as follows. 147 g. of 4-benzyloxyphenyl 4'-nitrophenyl ether, prepared in substantially the same manner described in Example I, were mixed with 600 g. of absolute alcohol and reduced in a rocking autoclave in the presence of 10 g. of palladium on charcoal catalyst. The product was crystallized from methanol-toluene and then was reductively alkylated with acetone in a rocking autoclave at 160° C. in the presence of 50 g. of platinum-alumina catalyst. The 4-hydroxyphenyl 4'-isopropylaminophenyl ether had a melting point of 169°–178° C. at 0.4 mm. Hg, a basic nitrogen content of 4.07 meq./g. and a basic mole combining weight of 245, the latter corresponding to the theoretical basic mole combining weight of 243.

EXAMPLE IV

The compound of this example is 4-hydroxyphenyl 2'-aminophenyl ether and was prepared as follows. 4-benzyloxyphenyl 2'-aminophenyl ether was prepared in substantially the same manner described in Example I, except that o-nitrochlorobenzene was used instead of p-nitrochlorobenzene. 45 g. of 4-benzyloxyphenyl 2'-aminophenyl ether were reduced with hydrogen in a Paar bomb in the presence of 150 g. of absolute methanol and 5 g. of a palladium on carbon catalyst. Six pounds of hydrogen were consumed. The product was recrystallized from toluene, and 4-hydroxyphenyl 2'-aminophenyl ether was collected, having a melting point of 175°–176° C. Elementary analyses of the product are reported below.

| Element | Found | Theoretical |
|---|---|---|
| Carbon | 71.89 | 71.626 |
| Hydrogen | 5.53 | 5.511 |
| Oxygen | 15.4 | 15.902 |
| Nitrogen | 7.20 | 6.961 |

EXAMPLE V

The compound of this example is 4-hydroxyphenyl 2'-sec-butylaminophenyl ether and was prepared as follows. 4-hydroxyphenyl 2'-aminophenyl ether, prepared as described in Example IV, was reductively alkylated at 160° C. in substantially the same manner hereinbefore set forth. The product (4-hydroxyphenyl 2'-sec-butylaminophenyl ether) had a basic nitrogen of 3.87 meq./g. and a basic mole combining weight of 258.3, the latter corresponding to the theoretical basic mole combining weight of 257. Elementary analyses gave the following:

| Element | Found | Theoretical |
| --- | --- | --- |
| Carbon | 74.89 | 74.68 |
| Hydrogen | 7.53 | 7.44 |
| Nitrogen | 5.40 | 5.44 |
| Oxygen | 12.43 | 12.44 |

EXAMPLE VI 3,5-dichloro-4-hydroxyphenyl-4'-aminophenyl ether is prepared as follows. One mole proportion of 4-hydroxyphenyl 4'-nitrophenyl ether is reacted with two mole proportions of chlorine at 60° C. in the presence of a ferric chloride catalyst to form 3,5-dichloro-4-hydroxyphenyl 4'-nitrophenyl ether. The 3,5-dichloro-4-hydroxyphenyl 4'-nitrophenyl ether is then reduced at 100° C. in a rocking autoclave sealed with hydrogen in the presence of a platinum-alumina catalyst to form 3,5-dichloro-4-hydroxyphenyl 4'-aminophenyl ether.

EXAMPLE VII 2,3,5,6-tetrachloro-4-hydroxyphenyl 4'-dimethylaminophenyl ether is prepared as follows. One mole proportion of 4-hydroxyphenyl 4'-nitrophenyl ether is reacted with 4 mole proportions of chlorine at 65° C. in the presence of ferric chloride catalyst to form 2,3,5,6-tetrachloro-4-hydroxyphenyl-4'-nitrophenyl ether. The last-mentioned compound then is subjected to reductive alkylation with at least 2 mole proportions of formaldehyde in substantially the same manner as hereinbefore set forth to form 2,3,5,6-tetrachloro - 4 - hydroxyphenyl 4' - dimethylaminophenyl ether.

EXAMPLE VIII 4-hydroxyphenyl 4'-salicyclaminophenyl ether is prepared by reacting 4-hydroxyphenyl 4'-aminophenyl ether, prepared as described in Example I, with salicylaldehyde and hydrogen in the presence of a platinum-alumina catalyst. Excess hydrogen is vented from the reaction mixture and the liquid products are fractionated to separate 4-hydroxyphenyl 4'-salicylaminophenyl ether.

EXAMPLE IX 4-hydroxyphenyl 4'-aminophenyl ether, prepared as described in Example I, and 4-hydroxyphenyl 4'-sec-butylaminophenyl ether, prepared as described in Example II, were evaluated as additives in grease. 0.3% by weight of the additive was incorporated in a commercial Mid-Continent lubricating oil having an S.A.E. viscosity of 20. Approximately 92% of the lubricating oil then is mixed with approximately 8% by weight of lithium stearate. The mixture is heated to about 230° C., with constant agitation. Subsequently the grease is cooled, while agitating, to approximately 120° C., and then the grease is further cooled slowly to room temperature.

The stability of the grease is tested in accordance with ASTM D–942 method, in which method a sample of the grease is placed in a bomb and maintained at a temperature of 121° C. Oxygen is charged to the bomb, and the time required for a drop of five pounds pressure is taken as the induction period.

The results of evaluations of the two additives described above are reported in the following table. For comparative purposes, the results obtained with a sample of the grease not containing an additive also are reported in the table.

Table I

| Additive (0.3% by weight) | Induction Period, Hours |
| --- | --- |
| None | 8 |
| 4-hydroxyphenyl 4'-aminophenyl ether | 196 |
| 4-hydroxyphenyl 4'-sec-butylaminophenyl ether | 191 |

From the data in the above table, it will be seen that the additives of the present invention were very effective in stabilizing the grease.

EXAMPLE X

The compounds of Examples I and II also were evaluated as additives in a synthetic lubricating oil marketed commercially under the trade name of "Plexol 201." As hereinbefore set forth, this is dioctyl sebacate.

The evaluation was made in accordance with an Oxygen Stability Test, in which a 100 cc. sample of the synthetic lubricating oil is placed in a bath maintained at 400° F. and air is blown therethrough at a rate of 5 liters of air per hour. The sample of synthetic lubricating oil is examined periodically and the time to reach an acid number of 5 is reported. It is apparent that the longer the time required to reach an acid number of 5, the more stable is the lubricating oil. In other words, it takes longer for the more stable oil to deteriorate.

When evaluated in the above manner, a sample of the lubricating oil without additive developed an acid number of 5 (induction period) in 9 hours. The sample of the dioctyl sebacate containing about 1% by weight of 4-hydroxyphenyl 4'-aminophenyl ether (prepared as described in Example I) did not develop an acid number of 5 until 12 hours. The sample of dioctyl sebacate containing 1% by weight of 4-hydroxyphenyl 4'-sec-butylaminophenyl ether (prepared as described in Example II) did not develop an acid number of 5 until 19 hours.

EXAMPLE XI 4-hydroxyphenyl 4'-sec-butylaminophenyl ether, prepared as described in Example II, and 4-hydroxyphenyl 2'-sec-butylaminophenyl ether, prepared as described in Example V, were evaluated as additives in another synthetic lubricating oil. This synthetic lubricating oil consists of esters of trimethylolpropane and is said to have an average molecular weight of about 457, the ester portions having an average of 7 carbon atoms each. Typical properties of such a lubricating oil, available commercially from the Celanese Corporation of America under the trade name of "Cellutherm," are set forth below:

Specific gravity, 60/60° F. _____ 0.965
Acidity, mg./KOH/g. _____ 0.03
Color, ASTM _____ 2
Fire point, COC, ° F. _____ 520
Flash point, COC, ° F. _____ 460
Hydrolysis number _____ 0.27

Viscosity:
    At −65° F., cs. _____ 14,900
    At 100° F., SSU _____ 76.93
    At 210° F., SSU _____ 37.77

The additive was incorporated in the synthetic lubricating oil in a concentration of about 1% by weight and the oil was evaluated in the same manner as described in Example X.

A sample of the synthetic lubricating oil without additive had an induction period of 9 hours. Another sample of the same oil containing 4-hydroxyphenyl 4'-sec-butylaminophenyl ether had an induction period of 38 hours. The sample of oil containing 4-hydroxyphenyl 2'-sec-butylaminophenyl ether had an induction period of 34 hours. From these data, it will be seen that the additives of the present invention were effective in retarding deterioration of the synthetic lubricating oil.

EXAMPLE XII

The compounds of Examples II and IV were evaluated as additives in polyethylene. The polyethylene of this example is of high density and marketed under the trade name of "Fortiflex" by the Celanese Corporation of America. The additive was used in a concentration of 0.075% by weight of the polyethylene and was incorporated therein by milling. The different samples of polyethylene were evaluated in a method similar to that described by Hawkins, Hansen, Matreyek and Winslow in Rubber Chemistry and Technology, October-November 1959, pages 1164–1170, except that an electrically heated aluminum block rather than an oven was used to maintain the desired temperature. The oxygen absorption of the sample was determined manometrically rather than volumetrically. In this method samples of the polyethylene, weighing about 0.5 gram each, are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to individual manometers containing mercury and the differential pressure is periodically determined. The induction period is taken as the number of hours required to reach a pressure differential of 20 cm. Hg.

The following table reports the results of the evaluations made with the samples of polyethylene containing the additives mentioned above. In each case the additive was used in a concentration of 0.075% by weight. The table also shows the results obtained with a blank or control sample (not containing an additive). The results are the average of duplicate runs.

*Table II*

| Additive | Induction Period Hours ΔP of 20 cm. Hg |
| --- | --- |
| None | 7.5 |
| 4-hydroxyphenyl 4'-sec-butylaminophenyl ether | 106 |
| 4-hydroxyphenyl 2'-aminophenyl ether | 194 |

From the data in the above table, it will be seen that the compounds of the present invention were very effective in extending the induction period of the samples of polyethylene.

EXAMPLE XIII 4-hydroxyphenyl 4'-sec-butylaminophenyl ether, prepared as described in Example II, also was evaluated as an additive in lard. The lard had a normal stability of one hour, as determined by the Swift test. This test is described in detail in the article by A. E. King, H. L. Roschen and W. H. Irwin, which appeared in Oil and Soap, vol. X, No. 6, pages 105–109 (1933), and modified as described in the article by R. W. Reimenschneider, J. Turner and R. M. Spec, which appeared in Oil and Soap, pages 169–171 (September 1943). In general, this test comprises bubbling air through a sample of the lard and determining rancidity organoleptically and by peroxide number. The result of this test is reported as the A.O.M. stability period, which is the number of hours required to reach a peroxide number of 20.

As hereinbefore set forth, the sample of lard without additive had an A.O.M. stability period of one hour. The sample of lard containing 0.02% by weight of 4-hydroxyphenyl 4'-sec-butylaminophenyl ether had an A.O.M. stability period of fifteen hours.

We claim as our invention:

1. Organic substances selected from the group consisting of lubricants, polyethylene and lard normally subject to oxidative deterioration containing, as an inhibitor therefor, a stabilizing concentration of from about 0.001% to about 25% by weight of a hydroxyphenyl aminophenyl ether of the following formula:

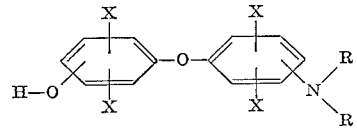

where R is selected from the group consisting of hydrogen, alkyl of from 1 to 20 carbon atoms, cycloalkyl having from 3 to 8 carbon atoms, phenyl, phenalkyl having from 1 to 4 carbon atoms in said alkyl, alkphenyl having from 1 to 6 carbon atoms in said alkyl, hydroxyalkyl having from 1 to 6 carbon atoms in said alkyl, hydroxyphenyl, hydroxyphenalkyl having from 1 to 4 carbon atoms in said alkyl and hydroxyalkphenyl having from 1 to 6 carbon atoms in said alkyl radicals, and X is selected from the group consisting of hydrogen, alkyl of from 1 to 6 carbon atoms, halogen and haloalkyl having from 1 to 4 carbon atoms in said alkyl radicals.

2. Lubricating oil normally subject to oxidative deterioration containing, as an inhibitor therefor, from about 0.01% to about 5% by weight of 4-hydroxyphenyl 4'-aminophenyl ether.

3. Lubricating oil normally subject to oxidative deterioration containing, as an inhibitor therefor, from about 0.01% to about 5% by weight of 4-hydroxyphenyl 4'-alkylaminophenyl ether having from 1 to 20 carbon atoms in said alkyl.

4. Lubricating oil normally subject to oxidative deterioration containing, as an inhibitor therefor, from about 0.01% to about 5% by weight of 4-hydroxyphenyl 2'-alkylaminophenyl ether having from 1 to 20 carbon atoms in said alkyl.

5. Grease normally subject to oxidative deterioration containing, as an inhibitor therefor, from about 0.01% to about 5% by weight of a 4-hydroxyphenyl 4'-aminophenyl ether.

6. Grease normally subject to oxidative deterioration containing, as an inhibitor therefor, from about 0.01% to about 5% by weight of 4-hydroxyphenyl 4'-alkylaminophenyl ether having from 1 to 20 carbon atoms in said alkyl.

7. Polyethylene normally subject to oxidative deterioration containing, as an inhibitor therefor, from about 0.01% to about 5% by weight of a 4-hydroxyphenyl 4'-aminophenyl ether.

8. Polyethylene normally subject to oxidative deterioration containing, as an inhibitor therefor, from about 0.01% to about 5% by weight of 4-hydroxyphenyl 4'-alkylaminophenyl ether having from 1 to 20 carbon atoms in said alkyl.

9. Polyethylene normally subject to oxidative deterioration containing, as an inhibitor therefor, from about 0.01% to about 5% by weight of 4-hydroxyphenyl 2'-alkylaminophenyl ether having from 1 to 20 carbon atoms in said alkyl.

10. Lard normally subject oxidative to deterioration containing, as an inhibitor therefor, from about 0.01% to about 5% by weight of 4-hydroxyphenyl 4'-alkylaminophenyl ether having from 1 to 20 carbon atoms in said alkyl.

(References on following page)

References Cited by the Examiner

UNITED STATES PATENTS

| | | | |
|---|---|---|---|
| 1,913,367 | 6/1933 | Calcott et al. | 252—403 X |
| 2,137,783 | 11/1938 | Prutton et al. | 252—51.5 X |
| 2,441,576 | 5/1948 | Jones et al. | 252—403 X |
| 2,910,437 | 10/1959 | Symon | 252—51.5 X |
| 2,926,093 | 2/1960 | Cyba | 252—403 X |
| 2,964,479 | 12/1960 | Cyba | 252—51.5 X |
| 3,063,962 | 11/1962 | Cyba | 260—571 X |

DANIEL E. WYMAN, *Primary Examiner.*